Figure 1:
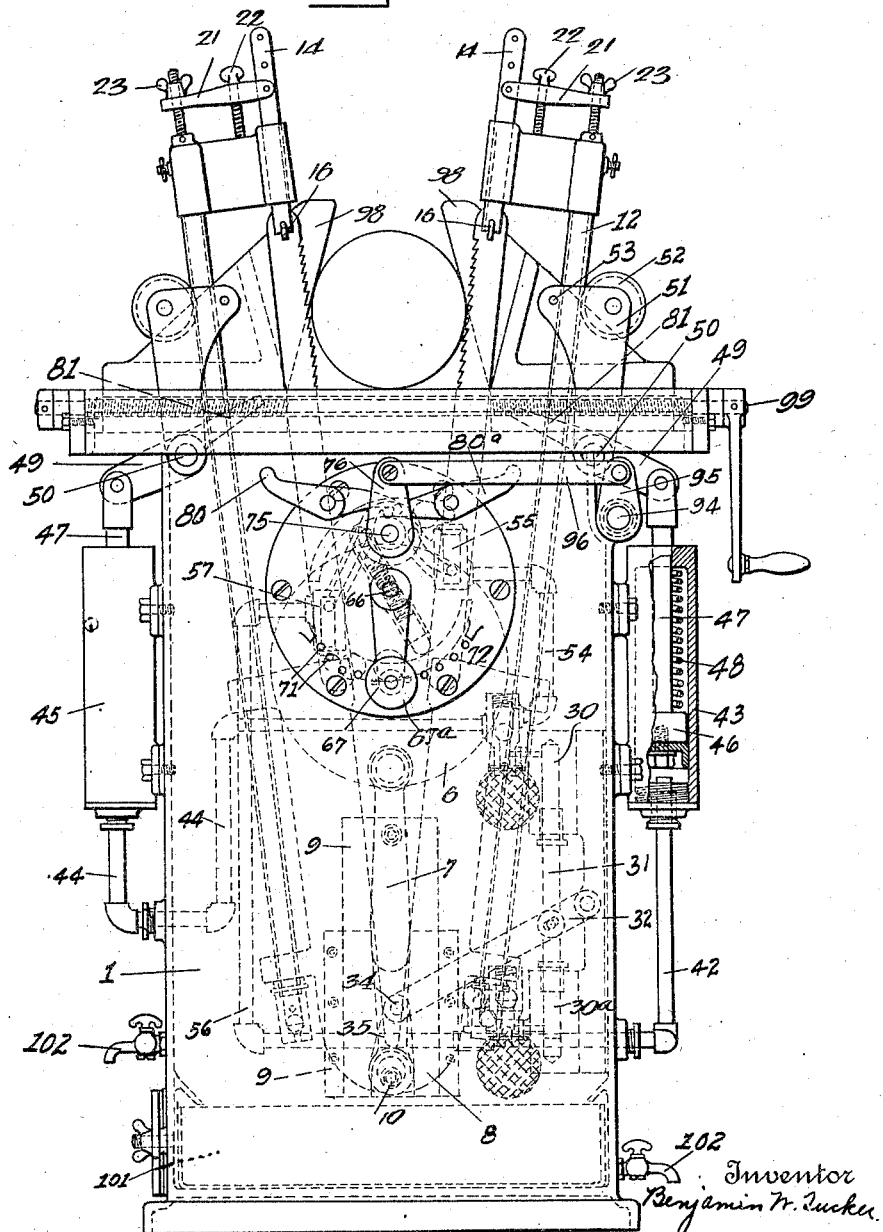

B. W. TUCKER.
DUPLEX SAWING APPARATUS.
APPLICATION FILED JAN. 18, 1917.

1,303,420.

Patented May 13, 1919.
8 SHEETS—SHEET 1

Inventor
Benjamin W. Tucker.
By his Attorneys
Criswell & Davis

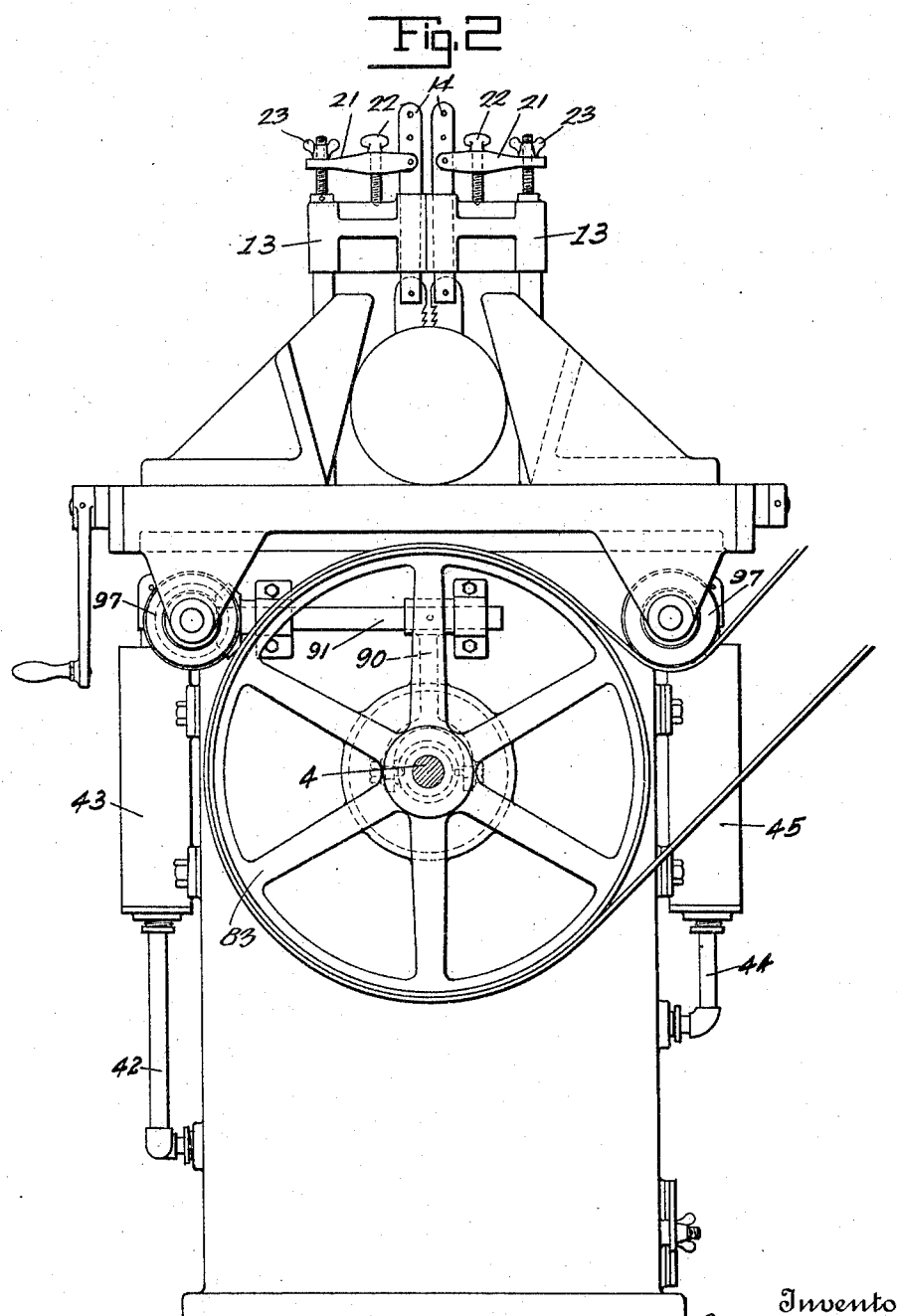

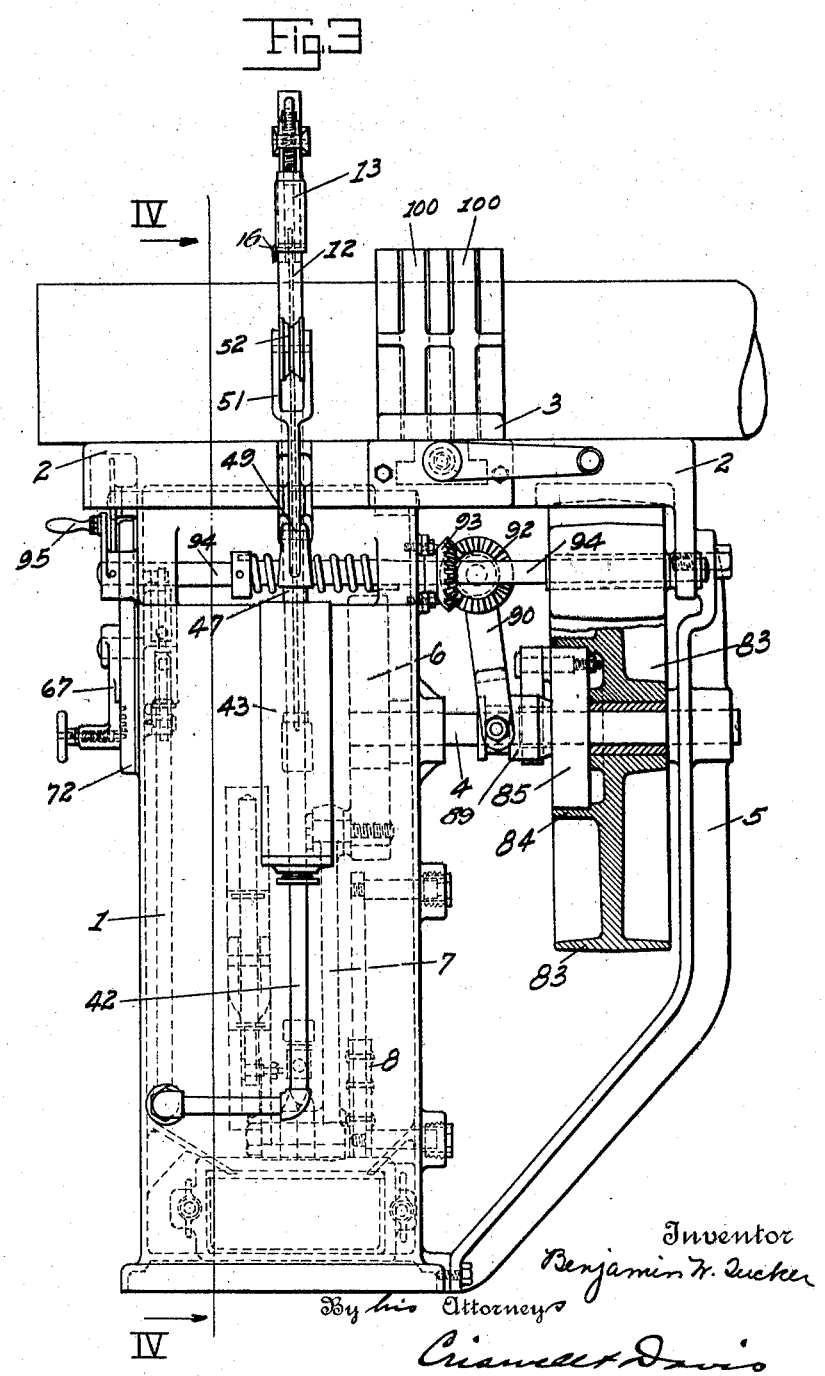

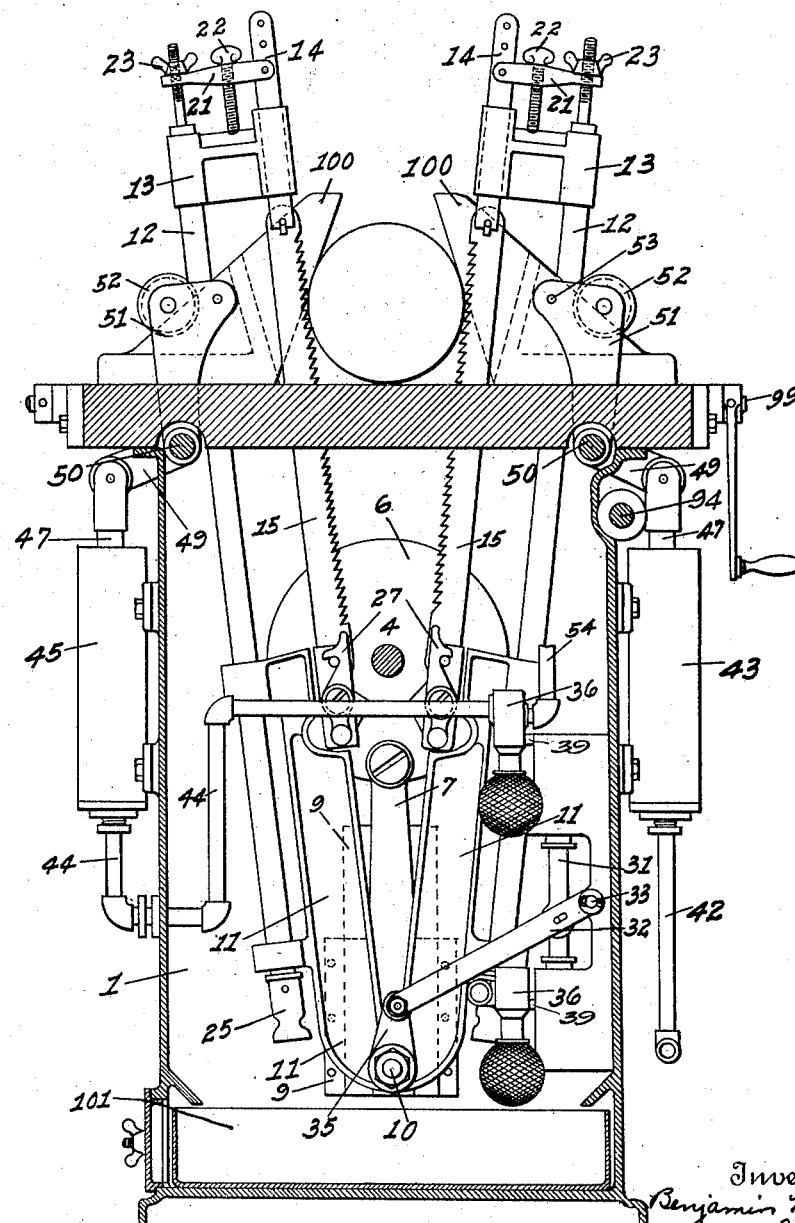

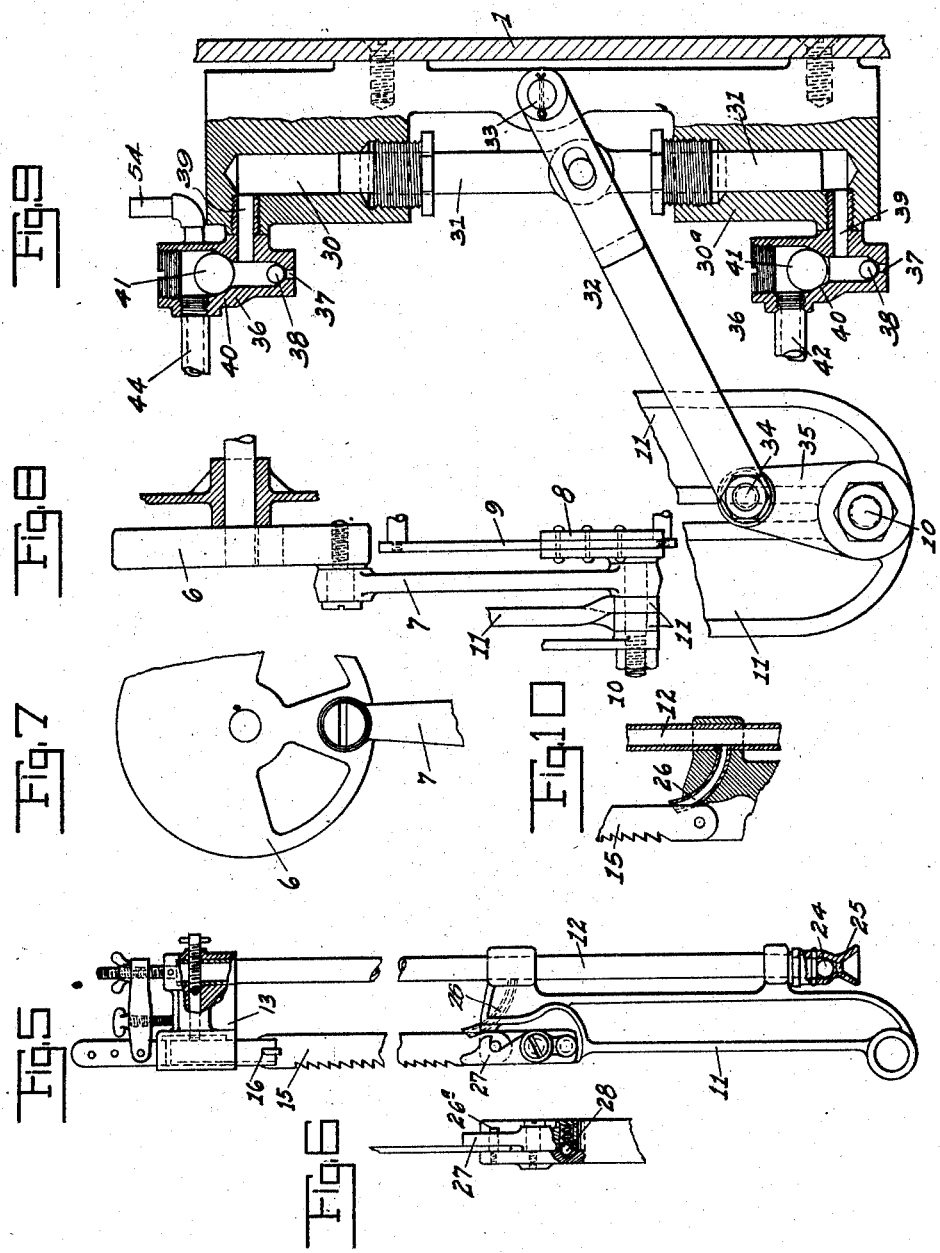

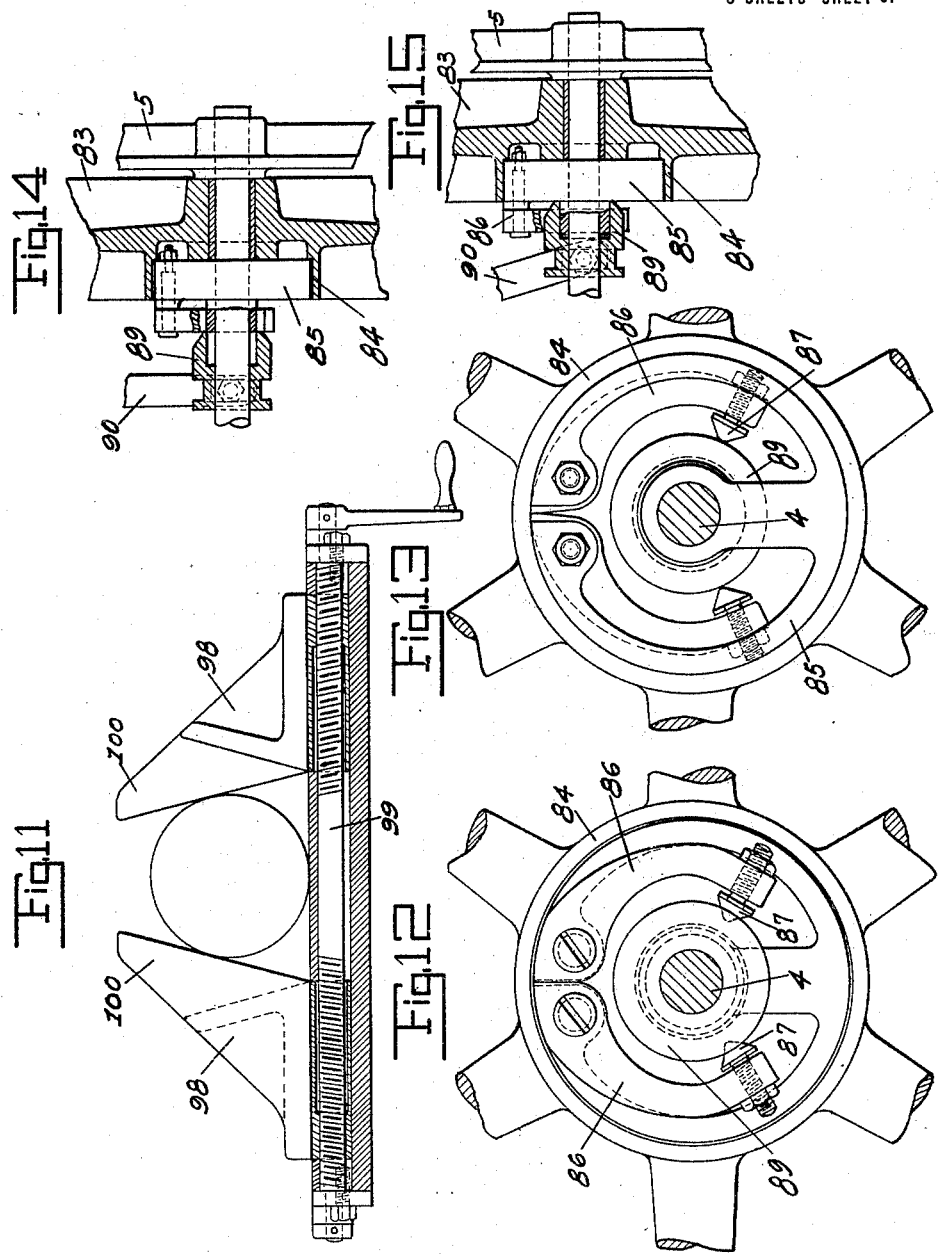

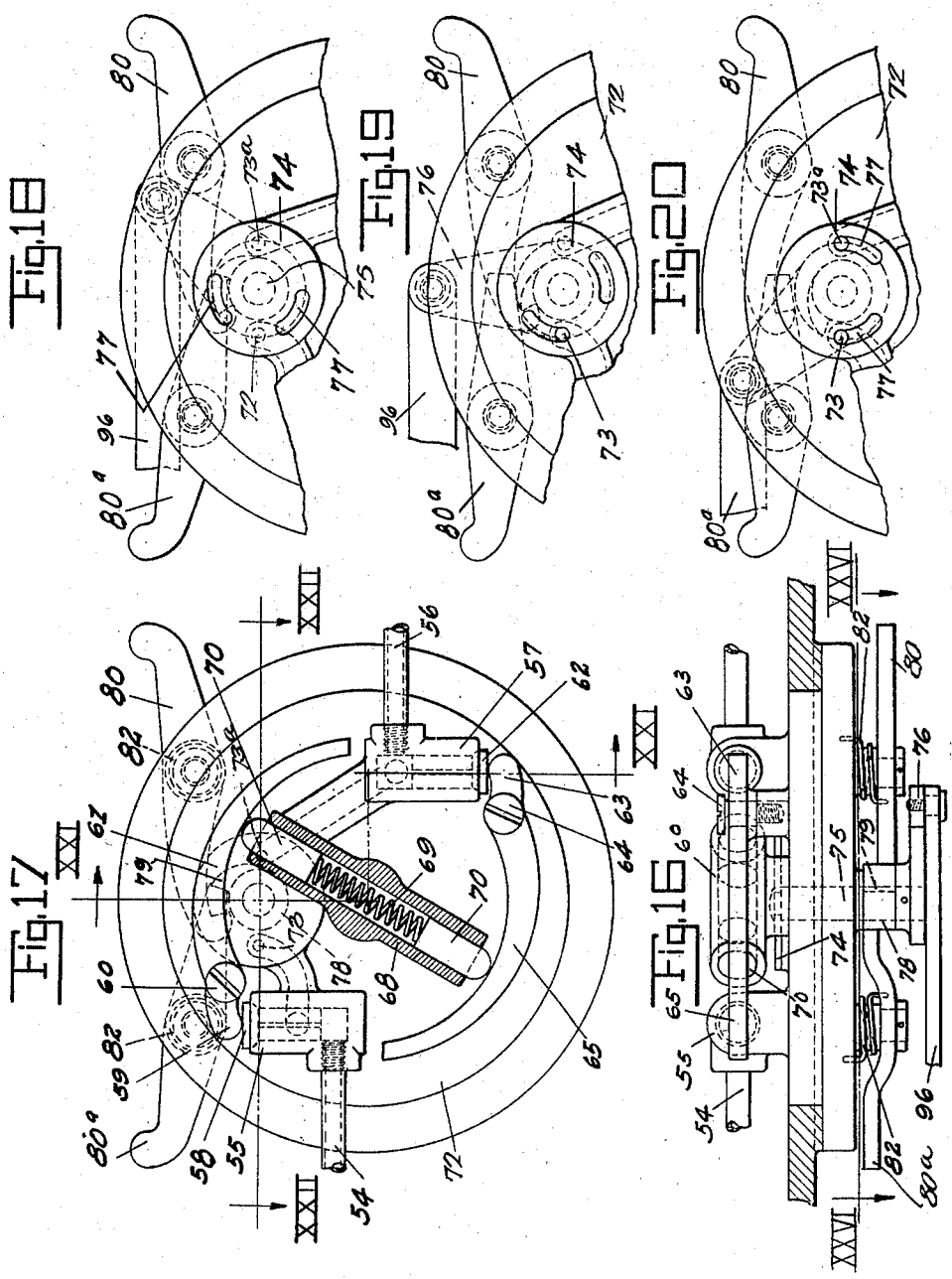

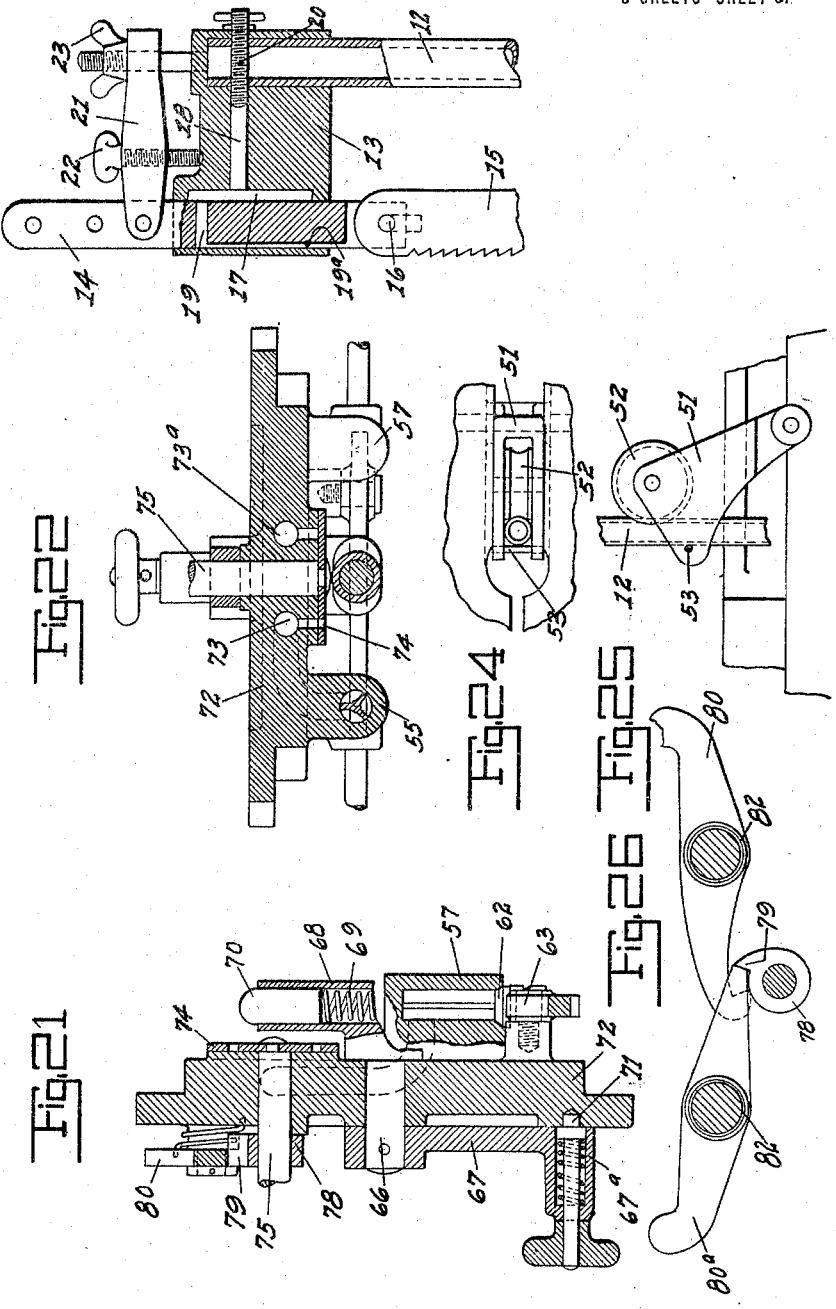

UNITED STATES PATENT OFFICE.

BENJAMIN W. TUCKER, OF SOUTH ORANGE, NEW JERSEY, ASSIGNOR TO COATS MACHINE TOOL COMPANY, INC., OF NEW YORK, N. Y., A CORPORATION OF NEW YORK.

DUPLEX SAWING APPARATUS.

1,303,420.     Specification of Letters Patent.     Patented May 13, 1919.

Application filed January 18, 1917. Serial No. 143,073.

*To all whom it may concern:*

Be it known that I, BENJAMIN W. TUCKER, a citizen of the United States, and a resident of South Orange, county of Essex, and State of New Jersey, have invented certain new and useful Improvements in Duplex Sawing Apparatus, of which the following is a full, clear, and exact description.

In the ordinary hack saw for sawing metal, there is a single blade which can cut on only one stroke of each cycle, the saw therefore doing effective work during only half the time that it is running.

In carrying out this invention two opposed saw blades are employed which reciprocate together on opposite sides of the work, have their teeth arranged in opposite directions so that one will cut on the forward stroke and the other on the back stroke and are movable from and toward each other to permit them to be opened to receive a piece of work and to approach each other as they saw through the work from opposite sides.

One of the principal objects of the invention is to provide a duplex sawing apparatus having reciprocable saws driven by means of suitably applied power, and to provide means whereby feeding pressure on the saws will be regulated and controlled by means of a fluid pressure device.

Another object of the invention is to provide a duplex sawing apparatus having reciprocable saws driven by suitably applied power, and to control the feed movements of the saws by means of fluid pressure devices actuated through the saw-reciprocating mechanism, whereby said feed movements will be dependent upon the saw reciprocating means.

Another object of the invention is to provide fluid pressure means for controlling the movement of the saws to the material to be operated upon.

A further object of the invention is to provide fluid pressure means to stop the machine automatically when the cut is completed.

Another object of the invention is to provide fluid pressure means whereby the pressure of the saws against the material being operated upon may be varied.

There are many other important objects and advantages of the invention, which will hereinafter appear.

In the drawings, Figure 1 is a front elevation of the machine with the saws adjusted to operate upon a bar;

Fig. 2 a rear elevation showing the saws in the position which they occupy when the saw-cut is almost completed;

Fig. 3 a side elevation of the machine, parts being shown in sections to more clearly illustrate the clutch mechanism;

Fig. 4 a vertical sectional view on the line IV—IV of Fig. 3;

Fig. 5 a detail side elevation, partly in section, of one of the saws and its holding frame;

Fig. 6 a detail view, partly in section, of the means for detachably connecting the lower end of the saw to the saw-frame;

Fig. 7 a detail view of the crank disk which reciprocates the saws;

Fig. 8 a detail side elevation of the saw-frame reciprocating means;

Fig. 9 a detail sectional view showing the fluid pump and its connection with the saw reciprocating means;

Fig. 10 a detail sectional view, showing the auxiliary means for lubricating and cooling the lower end of one of the saws;

Fig. 11 a transverse sectional view of the work holding clamp;

Fig. 12 a detail side elevation of the clutch in its rest position;

Fig. 13 a view similar to Fig. 12, showing the clutch ring expanded;

Fig. 14 a sectional view of the clutch with the parts in the position shown in Fig. 12;

Fig. 15 a similar view of the clutch with the parts in the position shown in Fig. 13;

Fig. 16 a bottom plan view of the means for controlling the pressure of the saws against the material to be cut and the means for releasing the pressure from the saws when the cut is completed;

Fig. 17 an elevation of the controlling means shown in Fig. 16, a portion thereof being in a sectional view;

Figs. 18, 19 and 20 detail views of the means for controlling the releasing of the saws when the saw-cut is completed, said views showing parts in successive positions;

Fig. 21 a vertical sectional view of the saw pressure controlling means taken approximately on the line XXI—XXI of Fig. 17;

Fig. 22 a horizontal sectional view taken approximately on the line XXII—XXII of Fig. 17;

Fig. 23 a detail sectional view of the means for holding the upper ends of the saws and supplying lubricating and cooling liquid thereto from above;

Fig. 24 a detail plan view of the saw-frame guiding means;

Fig. 25 a side elevation of the device shown in Fig. 24; and

Fig. 26 is a side elevation of the locking pawls as positioned with respect to the stop plate and lug.

Referring to the various parts by numerals, 1 designates a base of the machine which is shown in the form of a tank having an open top and designed to contain the supply of fluid which is used in the fluid pressure devices and for lubricating and cooling the saws. This base is provided with a top 2 adapted to support the work holding clamp 3 and the means for guiding the saw-frames and for swinging the saws toward and from the work. Mounted in the base is a driving shaft 4, the outer end of which is supported in a standard 5, the inner end thereof being within the base and carrying a crank disk 6. Connected to this disk is a pitman 7, the lower end of which is connected to a crosshead 8, mounted in suitable guides 9. Pivotally mounted on the pin 10 which connects the lower end of the pitman to the crosshead are upwardly extending saw frames 11, one of said frames being on each side of the central line of the machine and each being adapted to carry one saw blade. Each saw-frame is provided along its outer edge with a rigid tube 12, said tube extending a considerable distance upon the upper end of the saw frame 11, and constituting a guiding member for the upper portion of said frame. To the upper end of this tubular guide 12 is rigidly secured a saw-head 13, in which is formed a vertical socket adapted to receive the saw tensioning rod 14. The lower end of this tensioning rod is detachably connected to the upper end of the saw blade 15 by any suitable means, a removable pin 16 being shown in the drawings. In the saw-head and around the tensioning rod is formed a chamber 17, which is in communication with the tubular guide rod 12, through a port 18. The tensioning rod 14 is formed with a port 19 which communicates with the chamber 17, and leads lubricating fluid from said chamber to the upper end of the saw blade through a vertical port 19ª. Communication between the tubular guide rod and the port 18 is controlled by an adjustable valve 20 so that the amount of lubricating fluid passing from the guide 12 to the chamber 17 may be controlled. Connected to the tensioning bar 14 and carried by the saw-head is a tension device 21. By manipulating the adjusting screw 22 and the clamping nut 23, the lever of the tension device will be moved to bring the proper strain upon the tensioning bar 14. The bar 14 is provided with a series of apertures to permit it to be adjusted to saws of different lengths. The chamber 17 is of sufficient length to permit of this adjustment of the bar 14 while at the same time maintaining communication between the port 19 and said chamber. This permits the lubricating and cooling of the upper end of any saw that may be connected to the bar 14.

In the lower end of the guide member 12 is arranged a gravity ball valve 24, which is arranged to close an inlet port 25. It is manifest that as the saw frames reciprocate the tubular guiding member 12 will act as a pump. Fluid will unseat the ball valve 25 as the saw frames descend into the lubricating fluid, said valve seating upon the upward stroke of the frames. In this manner the cooling and lubricating fluid will be forced up through the member 12 and to the upper end of the saw through the ports 18, 19, 19ª and chamber 17. The upper part of lower saw-frame 11 is formed with a port 26, which communicates with the guiding member 12 and is arranged to deliver lubricating and cooling liquid to the lower end of the saw blade. The upper end of each of the lower saw-frames is provided with a pin 26ª adapted to fit in an aperture in the lower end of the saw blade. Pivoted on the said frame is a latch 27 which is adapted to fit over the pin 26ª to hold the saw blade thereon, a spring catch 28 holding said latch in engagement with the said pin. It is manifest that by loosening the tensioning device carried by the saw-head the latch 27 may be readily disconnected from the pin 26ª and the lower end of the saw blade disconnected from the saw frame.

Within the base 1 of the machine is mounted a pump 29, consisting of two cylinders 30 and 30ª, axially alined, and a piston or plunger 31 having its ends operating in the said cylinders. Operatively connected to said piston is a lever 32, one end of which is pivoted in the pump frame at 33, the other end being pivoted at 34 to the end of a rocking crank arm 35 mounted upon the pivot pin 10 of the cross head 8. It is manifest that as the saw frames are reciprocated through the pitman 7, the operating lever 32 will be vibrated and the piston rod reciprocated. Each cylinder is provided with a valve chamber 36; and each of said chambers is formed with an inlet port 37 controlled by a gravity ball valve 38. Each valve chamber is connected by a port 39 to the outer end of its respective cylinder. Each valve chamber is formed with an outlet port 40 controlled by a gravity ball valve 41. The outlet port from the valve chamber of cylinder 30ª is connected by a pipe 42 to the lower end of a pressure cylinder 43. The outlet port of the valve chamber connected to the cylinder 30 is connected by a pipe 44 to the lower end of the pressure cylinder 45. In each pressure cylinder is arranged a piston 46 connected to the lower end of a piston rod 47, said piston being normally maintained near the lower end of the cylinder by a pressure spring 48.

The upper ends of the piston rods 47 are connected to crank arms 49 pivoted at 50 in the main frame of the machine near the upper end thereof. Each crank arm 49 is rigidly secured to its pivot pin; and also rigidly secured to said pin is an upwardly extending guiding and pressure arm 51. This arm is apertured vertically to receive the adjacent tubular guiding member 12 of the saw frame, said guiding member bearing against a grooved guide roller 52. A pin 53 is provided in the guide arm 51 to loosely hold the tubular member 12 in position to engage with the roller 52. It is manifest that as the piston 46 in the pressure cylinder is forced upwardly, the guiding arm 51 will be swung inwardly and the saw will be brought into engagement with the piece or bar to be operated upon, and will be held with the required pressure. It is also manifest that as the cut is made the saw will be carried inwardly by the pressure exerted thereon through the guiding arm 51. The guiding arms 51 in their normal at-rest positions are so located that the saw frames extend upwardly and outwardly from their points of attachment to the cross head 8, and the saws diverge from their lower ends upwardly and are adapted to receive between them the piece to be operated upon. The saw blades are preferably arranged in reversed positions so that one makes a cut on the down stroke of the saw frame, the other making its cut on the upstroke. The guiding frames 51 fit closely in slots in the machine top and form efficient means for preventing any undesired vibration of the saw frames. The tubular guides 12 fit closely between the jaws of the guiding arms 51 so that they are also held against the vibration in the guiding arms. By this means the saw blades are accurately guided and maintained in the vertical plane of the desired cut.

The outlet port from the valve chamber of cylinder 30 is connected by pipe 54 to a relief cylinder 55 located near the upper part of the base and within the same. The outlet port of the valve chamber of cylinder 30ª is connected by a pipe 56 to a relief cylinder 57, also located near the upper end of the base. Relief cylinder 55 is provided with a relief valve 58 in its upper end, said valve being yieldingly held to its seat by a lever 59 pivoted at 60 and formed with a long actuating arm 61. The relief cylinder 57 is provided with a relief valve 62 which is yieldingly held closed by means of a lever 63 pivoted at 64 and formed with a long actuating arm 65. The arms 61 and 65 extend in opposite directions from their pivots and their inner surfaces are concentric, as shown clearly in Fig. 17. Concentrically arranged with respect to the inner surfaces of the arms 61 and 65 is a rotatable rod 66, the outer end of which is provided with a handle 67 at the front of the machine. The inner end of this rod carries a tubular cross bar 68 in which is arranged a pressure spring 69, said spring forcing outwardly two bearing pins 70, one at each end of the cross bar. One of these pressure pins bears on the inner concentric surface of the arm 61 of the lever 59, the other bearing on the concentric surface of the arm 65 of lever 63. The said arms 61 and 65 are forced outwardly by said pressure pins, thereby yieldingly holding the relief valves 58 and 62 on their seats. It is manifest that by rotating the rod 66 to bring the pressure pins at the desired points on the concentric arms, the leverage may be varied and the desired pressure exerted upon the relief valves. The rotatable rod 66 is mounted in the center of a circular plate 72, which is secured to the front wall of the base and closes a correspondingly shaped aperture therein. In the face of this plate is formed a series of recesses 71, adapted to be engaged by a suitable latch 67ª carried by the handle 67 in order to fix the cross bar 68 in position to exert the desired pressure on the relief valves.

From the foregoing it is manifest that when the desired fluid pressure has been accumulated in the pressure cylinders the relief valves will yield to any excess pressure and open. By this means excess pressure on the saw blades through the guiding and pressure arms 51 will be effectually prevented.

The relief cylinders 55 and 57 are formed integral with plate 72. Formed in said plate and connected to the said relief cylinders are releasing ports 73 and 73ª, said releasing ports being adapted to be closed by means of a rotatable valve plate 74 mounted upon the inner end of a horizontal valve rod 75, a crank arm 76 being secured to the outer end of said rod, as shown clearly in Fig. 1. The valve plate 74 is formed with concentric slots 77 adapted to register with the releasing ports 73 and 73ª. Mounted on the valve rod is a stop plate 78, formed with a stop lug 79, and pivoted on the face of the plate 72 are two pawls 80 and 80ª said pawls extending inwardly and lying in the path of the stop lug. The pawl 80ª engages the stop lug and holds said lug out of engagement with the hooked inner end of the pawl 80, the said lug being arranged to engage the end of pawl 80 when released from pawl 80ª, as will be fully hereinafter described. The stop lug 79 is broad and the pawls 80 and 80ª are comparatively narrow so that said pawls may lie side by side and both engage, in turn, the stop lug. When the stop lug is engaged by the inner end of the pawl 80 the valve plate 74 is in the position shown in Fig. 18, and both of the release ports 73 and 73ª are closed. These ports remain closed until the saw cut is nearly completed.

Secured rigidly to the pivot pins 50 are inwardly and upwardly extending release arms 81 which are adapted to be brought into contact with the upwardly and outwardly extending arms of the pawls 80 and 80ª. As shown in the drawing, the actuating arm of pawl 80ª is set closer to its cooperating arm 81 than is arm 80. It is manifest, therefore, that pawl 80ª will be released from the stop lug 79 slightly before arm 81 reaches the actuating arm of pawl 80. This will permit one of the saws to operate for a desired time interval after the other saw has completed its cut and has returned to its non-cutting position. When the release arm 81 engages the actuating arm of pawl 80ª, and releases said pawl from the stop lug 79, the valve plate 74 is automatically rotated to the position shown in Fig. 19, thereby opening port 73 and relieving the pressure from cylinder 43. This permits the saw controlled by said cylinder 43 to return to its at-rest position out of the path of the other saw, while at the same time there is not sufficient movement to release the clutch, hereinafter described. The opposite saw will continue its operation until the pawl 80 is released from the stop lug, whereupon the valve plate automatically assumes the position shown in Fig. 20. In this latter position both relief ports 73 and 73ª are open and the pressure in cylinders 43 and 45 is released. It is manifest from the foregoing that the saw controlled by pressure cylinder 43 may be arranged to cut nearly to the center of the piece to be cut and then return to its normal or non-cutting position. The saw controlled by pressure cylinder 45 may be arranged to cut slightly beyond the center of the piece being operated upon, so that the cut will be completed without any danger of the saws engaging each other. When the pawl 80 is released from the stop lug the valve rod is rotated sufficiently to release the driving clutch as will be hereinafter fully described.

The pawls 80 and 80ª are maintained in position to be engaged by the stop lugs by springs 82. On the driving shaft 4 is mounted a loose driving belt wheel 83 which is formed with a friction clutch rim 84. Within this clutch rim is arranged a split expanding clutch member 85 adapted to engage the clutch rim, as will be hereinafter described. Mounted on this expanding member near the ends thereof are two levers 86, the adjacent ends of which are adapted to engage each other for the purpose of expanding the split clutch member. The other ends of these levers are provided with adjustable dogs 87 adapted to be engaged by a slidable cone 89 mounted on the driving shaft 4. Connected to this slidable cone is an upwardly extending lever arm 90 carried by a horizontally arranged rock shaft 91. The rock shaft is provided with a beveled pinion 92 which engages a similar pinion 93 on a rock shaft 94. Coiled around this shaft 94 is a spring 95 which normally holds said shaft in position to retract the expanding cone from between the lever arms 86 so that the belt wheel 83 will normally run free of the driving shaft. Secured to the forward end of the rock shaft 94 is a handle 95; and said handle is connected by means of a link 96 to the crank arm 76 of the rotatable valve rod 75. To start the machine in operation the handle 95 is moved to the left, as viewed in Fig. 1, until the stop lug 79 is engaged with the pawl 80ª. This movement of the shaft 94 will be sufficient to operate the clutch and to connect the driving wheel 83 to the driving shaft. When, however, the pawls 80ª and 80 are successively released from the stop lug, the spring 95 will rotate the shaft 94 and through the link 96 operate valve rod 75 to open the releasing ports 73ª and 73 and finally disconnect the clutch.

Suitably mounted on the base are two idle belt wheels 97, over which the driving belt may be run, one of said idle wheels being provided on each side of the machine in order that the belt may be run from either side.

The work clamp may be of any suitable construction. As shown in the drawings, it consists of two gripping jaws 98 mounted to slide upon the top of the machine and to be adjusted by means of the screw 99. The gripping jaws 98 are each formed with upwardly and forwardly extending gripping fingers 100 which are adapted to pass each other as the jaws are brought close together in order that material of small diameter may be gripped and securely held.

When the pressure is released from the pressure cylinders through the operation of the pawls 80 and 80ᵃ and the opening of the release ports 73 and 73ᵃ, the springs 48 in the pressure cylinders force the pistons downwardly and restore the saws to their normal at-rest positions, that is to say, move said saws laterally to the position shown in Fig. 1.

The saw which is controlled by the pressure cylinder 43, cuts on the down stroke, while the saw controlled through pressure cylinder 45 cuts on the up stroke. Pressure cylinder 43 is connected to the pump cylinder 30ᵃ which cylinder receives its fluid on the down stroke of the saw frame. This brings the pressure on the saw controlled by the said cylinder on the cutting stroke of said saw. Fluid pressure is delivered to cylinder 45 upon the up stroke of the saw frame so that pressure is delivered to the saw controlled by said cylinder on the cutting stroke thereof. It is therefore manifest that the feeding pressure is brought on each saw only during its cutting stroke, the pressure being somewhat relieved upon the non-cutting stroke.

The lower part of the base is provided with a pan 101 which is designed to catch the particles of material removed by the saws; and said pan is removable through the side of the base in order that the interior of the base may be readily cleaned.

While the invention is shown and described as embodied in a duplex sawing apparatus, it is manifest, that it may be applied in many of its features to a single sawing apparatus.

Suitable draining valves are connected to the bottom of the base in order to drain off the lubricating and cooling liquid, said draining valves being indicated at 102 in Fig. 1 of the drawings.

Having thus described my invention, I claim as new and desire to secure by Letters Patent:—

1. A sawing apparatus comprising a reciprocable saw, fluid pressure means for forcing said saw laterally for the feed movement, and means for maintaining said fluid pressure constant throughout each cutting stroke of the saw.

2. A sawing apparatus comprising a reciprocable saw, fluid pressure means for forcing said saw laterally for the feed movement, means for maintaining said fluid pressure constant throughout each cutting stroke of the saw, and means for relieving the saw of the fluid pressure at a predetermined point in its lateral feed movement.

3. A sawing apparatus comprising a reciprocable saw, fluid pressure means for forcing said saw laterally for the feed movement, means for maintaining said fluid pressure constant throughout each cutting stroke of the saw, means for relieving the saw of the fluid pressure at a predetermined point in its lateral feed movement, and means for returning the saw laterally to its at-rest position.

4. A duplex sawing apparatus, comprising two opposed alined reciprocable saws, fluid pressure means forcing said saws toward each other, and means for varying said fluid pressure.

5. A duplex sawing apparatus, comprising two opposed alined reciprocable saws, fluid pressure means forcing said saws toward each other, and means for preventing an excess of pressure on said saws.

6. A duplex sawing apparatus, comprising two opposed alined reciprocable saws, fluid pressure means forcing said saws toward each other, and means for relieving the pressure on said saws at predetermined points in the lateral movement of the saws.

7. A duplex sawing apparatus, comprising two opposed alined reciprocable saws, fluid pressure means forcing said saws toward each other, and means for relieving the pressure on said saws at predetermined points in the lateral movement of the saws, said pressure relieving means operating to permit one saw to cut into the zone of the opposed saw.

8. A duplex sawing apparatus, comprising two opposed alined reciprocable saws, fluid pressure means forcing said saws toward each other, and means for relieving the pressure on said saws at a predetermined point in the lateral movement of the saws, said pressure relieving means acting to relieve one saw ahead of the other, whereby one saw may be permitted to cut into the zone of the opposed saw.

9. A duplex sawing apparatus, comprising two opposed alined reciprocable saws, fluid pressure means forcing said saws toward each other, means for relieving the pressure on said saws at predetermined points in the lateral movement of the saws, said pressure relieving means acting to relieve one saw ahead of the other whereby one saw may be permitted to cut into the zone of the opposed saw, and means for withdrawing the saws to their normal at-rest position when the feeding pressure thereon is relieved.

10. A duplex sawing apparatus, comprising two opposed reciprocable saws, fluid pressure means forcing said saws toward each other, and means operated through the saw reciprocating means to maintain the desired pressure on the saws.

11. A duplex sawing apparatus, comprising two opposed alined reciprocable saws, fluid pressure means forcing said saws toward each other, a pump connected to the fluid pressure means, and means connecting said pump to the saw reciprocating means.

12. A duplex sawing apparatus, comprising two opposed reciprocable saws, fluid pressure means forcing said saws toward each other, a pressure cylinder for each saw, means for supplying fluid under pressure to said cylinders, a piston in each of said cylinders adapted to be moved by said fluid pressure, means connecting said pistons to the saw frames to move said frames toward each other, and means to relieve the fluid pressure in said cylinders at predetermined points in the lateral movement of the saws.

13. A duplex sawing apparatus, comprising two opposed alined reciprocable saws, a pressure cylinder for each saw, means for supplying fluid under pressure to said cylinders, a piston in each of said cylinders adapted to be moved by said fluid pressure, means connecting said pistons to the saw frames to move said frames toward each other, means to relieve the fluid pressure in said cylinders at predetermined points in the lateral movement of the saws, an automatically operating pressure controlling means connected to each of said cylinders, and means operated at predetermined points in the lateral movement of the saws to relieve the pressure in the pressure cylinders.

14. A duplex sawing apparatus, comprising two opposed alined reciprocable saws, a pressure cylinder for each saw, means for supplying fluid under pressure to said cylinders, a piston in each of said cylinders adapted to be moved by said fluid pressure, means connecting said pistons to the saw frames to move said frames toward each other, means to relieve the fluid pressure in said cylinders at predetermined points in the lateral movement of the saws, an automatically operating pressure controlling means connected to each of said cylinders, means operated at predetermined points in the cutting strokes of the saws to relieve the pressure in the pressure cylinders, and means for returning the saws to their normal at-rest positions after the fluid pressure in the cylinders has been released.

15. A duplex sawing apparatus, comprising two opposed alined reciprocable saws, fluid pressure means forcing said saws toward each other, a saw reciprocating means, and means operating at predetermined points in the cutting strokes of the saws to release the fluid pressure and to stop the saw reciprocating means.

16. A sawing apparatus comprising a reciprocable saw, fluid pressure, means for forcing said saw laterally for the feed movement, a relief cylinder connected to said fluid pressure means, a relief valve in said cylinder, and means for yieldingly holding said relief valve to its seat, whereby said valve will yield to an excess pressure in the fluid pressure means.

17. A sawing apparatus comprising a reciprocable saw, fluid pressure, means for forcing said saw laterally for the feed movement, a relief cylinder connected to said fluid pressure means, a relief valve in said cylinder, means for yieldingly holding said relief valve to its seat, whereby said valve will yield to an excess pressure in the fluid pressure means, and means for varying the pressure on said valve.

18. A sawing apparatus comprising a reciprocable saw, fluid pressure means for forcing said saw laterally for the feed movement, a relief cylinder connected to said fluid pressure means, a relief valve in said cylinder, a lever engaging said relief valve, and a movable pressure device adapted to engage one arm of said lever to vary the pressure on said relief valve.

19. A duplex sawing apparatus, comprising two opposed reciprocable saws, fluid pressure means forcing said saws toward each other, relief cylinders connected to said fluid pressure means, a relief valve for each of said cylinders, a lever operating on each of said valves, and a swinging pressure device adapted to bear on the free arms of said levers to vary the pressure on the relief valves.

20. A duplex sawing apparatus, comprising two opposed reciprocable saws, fluid pressure means forcing said saws toward each other, relief cylinders connected to said fluid pressure means, a relief valve for each of said cylinders, the free arms of said levers extending in opposite directions and the adjacent surfaces of said arms being concentric, and a rotatable pressure device adapted to bear on the concentric surfaces of said arms to vary the pressure on the valves.

21. A duplex sawing apparatus, comprising two opposed reciprocable saws, fluid pressure means forcing said saws toward each other, relief cylinders connected to said fluid pressure means, a relief valve for each of said cylinders, the free arms of said levers extending in opposite directions and the adjacent surfaces of said arms being concentric, a rotatable pressure device adapted to bear on the concentric surfaces of said arms to vary the pressure on the valves, and means for indicating the position of the pressure device.

22. A sawing apparatus comprising a reciprocable saw, fluid pressure means for forcing said saw laterally for the feed movement, means for maintaining said fluid pressure constant throughout each cutting stroke of the saw, means for relieving the saw of the fluid pressure at predetermined points in its lateral feed movement, said means operating to automatically stop the saw reciprocating means.

23. A sawing apparatus comprising a reciprocable saw, fluid pressure means for forcing said saw laterally for the feed movement, means for maintaining said fluid pressure constant throughout each cutting stroke of the saw, a valve device for relieving the fluid pressure, means operating said valve device at predetermined points in the movement of the saw, and means connected to said valve device to stop the saw reciprocating means.

24. A duplex sawing apparatus, comprising two opposed reciprocable saws, fluid pressure means for forcing said saws toward each other, a valve device for releasing said fluid pressure means operated at predetermined points in the feed movement of one saw to operate said valve device to relieve the pressure from said saw, means operated at a predetermined point in the feed movement of the other saw to relieve the pressure on said saw, and means operated through said valve device to stop the saw reciprocating means when the fluid pressure on the second saw is released.

25. A duplex sawing apparatus comprising two opposed reciprocable saws, fluid pressure means for forcing said saws toward each other, a valve device for relieving said pressure, a pair of pawls controlling said valve device, means for releasing one of said pawls at a predetermined point in the feed movement of one of the saws, means for releasing the other pawl at a predetermined point in the feed movement of the other saw, one of said pawls being operated ahead of the other, and means for returning said saws to their normal at-rest position upon the release of each of said pawls, one of said pawls being operated ahead of the other.

26. A duplex sawing apparatus comprising two opposed reciprocable saws, fluid pressure means for forcing said saws toward each other, a valve device for relieving said pressure, a pair of pawls controlling said valve device, means for releasing one of said pawls at a predetermined point in the feed movement of one of the saws, means for releasing the other pawl at a predetermined point in the feed movement of the other saw, one of said pawls being operated ahead of the other, means for returning said saws to their normal at-rest position upon the release of each of said pawls, one of said pawls being operated ahead of the other, and means for stopping the saw reciprocating means when the second pawl is released.

27. A sawing apparatus comprising a reciprocable saw, a pressure cylinder, a piston therein, means for supplying fluid under pressure to said cylinder, a saw frame guiding and pressure arm, means connecting said arm to said piston, a valve device, and an arm connected to the pressure and guiding arm adapted to operate said valve device to relieve the pressure in the said cylinder at a predetermined point in the feed movement of the saw.

28. A sawing apparatus comprising a reciprocable saw, a pressure cylinder, a piston therein, means for supplying fluid under pressure to said cylinder, a saw frame guiding and pressure arm, means connecting said arm to said piston, a valve device, an arm connected to the pressure and guiding arm adapted to operate said valve device to relieve the pressure in the said cylinder at a predetermined point in the feed movement of the saw, and means in the pressure cylinder to return the saw to its normal at-rest position.

29. A sawing apparatus comprising a reciprocable saw, fluid pressure means for forcing said saw laterally for the feed movement, means for maintaining said fluid pressure constant throughout the cutting movement of the saw, and an adjustable pressure controlling device.

30. A sawing apparatus comprising a saw, means for operating said saw, fluid pressure means for forcing said saw for its feed movement, and means for maintaining said fluid pressure constant throughout the cutting operation.

31. A sawing apparatus comprising a saw, means for operating said saw, fluid pressure means for forcing said saw for the feed movement, means for maintaining said fluid pressure constant during the cutting operation, and means for relieving the saw of the fluid pressure at a predetermined point in its feed movement.

32. A sawing apparatus comprising a saw, means for operating said saw, fluid pressure means for forcing said saw for the feed movement, means for maintaining said fluid pressure constant during the cutting operation, means for relieving the saw of the fluid pressure at a predetermined point in its feed movement, and means for returning the saw to its at-rest position.

33. A duplex sawing apparatus comprising two opposed alined saws, fluid pressure means forcing said saws toward each other, and means for varying said fluid pressure.

34. A duplex sawing apparatus comprising two opposed alined saws, fluid pressure means forcing said saws toward each other, and means for relieving the pressure on said saws at predetermined points in the feeding movement of the saws.

35. A duplex sawing apparatus comprising two opposed alined saws, fluid pressure means forcing said saws toward each other, and automatically operating other means for relieving the pressure on said saws at predetermined points in the feed movement of the saws, said pressure relieving means permitting one saw to cut into the zone of the opposed saw.

36. A sawing apparatus comprising a reciprocable saw, a pump carried by said saw, means connecting said pump to the upper and lower ends of the saw blade and adapted to deliver lubricating and cooling fluid to both ends of said blade, and means for supplying lubricating fluid to said pump.

37. A sawing apparatus comprising a saw, fluid pressure means for forcing said saw for the feed movement, and means for operating said fluid pressure means only during the cutting stroke of the saw.

38. A duplex sawing apparatus comprising a base forming a tank for lubricating and cooling liquid, a sawing apparatus mounted thereon, fluid pressure means feeding said saws to the work, and a pan removable through the side of said base at the bottom thereof for catching the waste particles cut by the saw.

39. A duplex sawing apparatus comprising two opposed alined reciprocable saws normally separated from each other to receive the work piece between them, fluid pressure means forcing said saws toward each other for the feed movement, means for relieving the pressure on said saws at predetermined points in the feed movement of said saws, and means for returning the saws to their normal separated positions.

40. In a hack saw, the combination of a saw and means for reciprocating it, means for automatically feeding the saw embodying devices whereby elastic-fluid under pressure forms the medium for both feeding the saw and resiliently pressing it against the work and means whereby the fluid pressure-feeding means will deliver lubricating and cooling fluid to the saw.

41. In a hack saw, a pair of alined saws and means for reciprocating them, means for feeding the saws step by step to the work, said means embodying devices whereby elastic-fluid under pressure forms the medium for resiliently pressing the saw against the work during the working stroke and means whereby the fluid pressure-feeding means will deliver lubricating and cooling fluid to the saw.

42. In a sawing machine, the combination of a saw and means for reciprocating it, and means for feeding the saw step by step against the work, this latter means embodying a piston and cylinder, devices whereby pressure on the piston transmits pressure to the saw to thereby hold the saw against the work, and automatic devices for forcing elastic-fluid into the cylinder behind the piston at the beginning of each working stroke of the saw to thereby not only feed the saw but provide an elastic fluid-pressure medium for holding the saw against the work.

43. In a duplex hack saw, the combination of a pair of alined saws and means for reciprocating them, and means for independently imparting to the saws a step by step feed, this latter means embodying a cylinder and piston for each saw, devices connecting the piston to one of the saws, and automatic means for admitting elastic-fluid under pressure behind the piston at the beginning of each working stroke of the saw and cutting off the air at the end of the working stroke of the saw, whereby an elastic fluid-pressure medium is provided for feeding the saw as well as for resiliently holding it against the work.

44. In a hack saw, the combination of a saw and means for reciprocating it, means for automatically feeding the saw embodying devices whereby fluid under pressure forms the medium for both feeding the saw and resiliently pressing it against the work, said means also delivering the said fluid to the saw to lubricate and cool it.

45. In a hack saw, the combination of a saw and means for reciprocating it, means for automatically feeding the saw embodying devices whereby fluid under pressure forms the medium for both feeding the saw and resiliently pressing it against the work, said means also delivering the said fluid to both ends of the saw to lubricate and cool it.

This specification signed this 17th day of January, A. D. 1917.

BENJAMIN W. TUCKER.

Copies of this patent may be obtained for five cents each, by addressing the "Commissioner of Patents, Washington, D. C."